Sept. 14, 1948.  E. A. BLACK  2,449,049

ADJUSTABLE SUPPORT

Filed March 9, 1945

INVENTOR.
ERIC A. BLACK
BY
*William D. Hall*
ATTORNEY

Patented Sept. 14, 1948

2,449,049

UNITED STATES PATENT OFFICE 2,449,049

ADJUSTABLE SUPPORT

Eric A. Black, Red Bank, N. J.

Application March 9, 1945, Serial No. 581,816

7 Claims. (Cl. 248—361)

(Granted under the act of March 3, 1883, as amended April 30, 1928; 370 O. G. 757)

The invention described herein may be manufactured and used by or for the Government for governmental purposes, without the payment to me of any royalty thereon.

This invention relates to adjustable supports, and more particularly to supports which allow a certain amount of universal movement of a load relative to a base and may also permit longitudinal adjustment of the support so as to vary the distance between said load and said base.

It is often desirable that supporting means for various devices and instruments, such as cinematographic apparatus, surveying instruments, electronic devices, and the like, be universally adjustable so as to enable the device or instrument to be suitably oriented relative to a base. In addition, such angular orientation frequently requires a compensating lengthening or shortening of the supporting means.

For instance, a particular radio antenna is sustained on a tripod secured to the floor of a motor vehicle. For proper operation from a fixed site, the antenna must be exactly level. As the floor of the vehicle may not be absolutely level, due to irregularities of the site, the relative lengths and angular dispositions of the tripod legs, relative to the said floor, must be suitably adjustable. The particular embodiment of the present invention, which is shown in the drawings appended hereto, was designed to support each leg of the said tripod, but it will be understood that the invention may of course take modified forms and may be used in many other applications.

It is, therefore, one object of the present invention to provide a support which may be secured to a base and may be universally positioned relative thereto.

It is another object to provide a support which will remain tightly anchored to a base despite universal adjustments.

It is another object to provide such a device which is inexpensive and simple to produce and may be fabricated almost entirely of readily available parts, with a limited amount of machining thereof being necessary.

It is still another object to provide a support which is adjustable both universally and longitudinally.

Generally, the present invention comprises a pair of opposing roller members fastened to the opposite surfaces of a base or bearing plate, by bolt members have curved rolling surfaces, in contact respectively with the said bearing surfaces, so that said roller members may roll back and forth on said bearing surfaces. One of said roller members may be the head of a bolt extending through the bearing plate. The roller surfaces and/or the bearing surfaces are suitably curved to maintain contact therebetween during rolling motion of the support.

The proximal extremity of a leg member is pivotably secured to one of the roller members, so as to allow it to swing about a pivot axis which is positioned at right angles to the axis of the rolling surface of said roller member. The rolling member about the rolling axis and the swinging movement about the pivot axis permit a universal movement. Bearing contact between the rolling surfaces and the bearing surfaces respectively will be maintained during such movements. The distal extremity of said leg member is secured to a load, such as a radio antenna. The leg member may or may not be longitudinally variable.

A preferred embodiment of the present invention is shown in the annexed drawings, wherein Figure 1 is a partly sectioned, elevational view of an adjustable support, providing both longitudinal and universal adjustment, wherein the leg member is shown oriented to a position perpendicular to the bearing plate;

Figure 1:
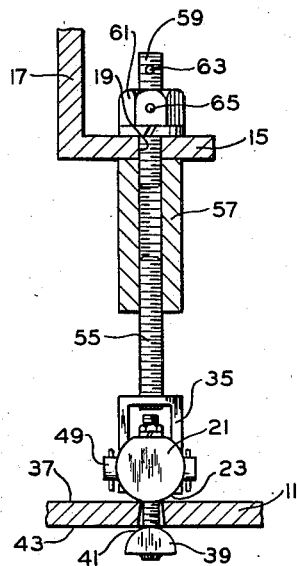
Figure 2:
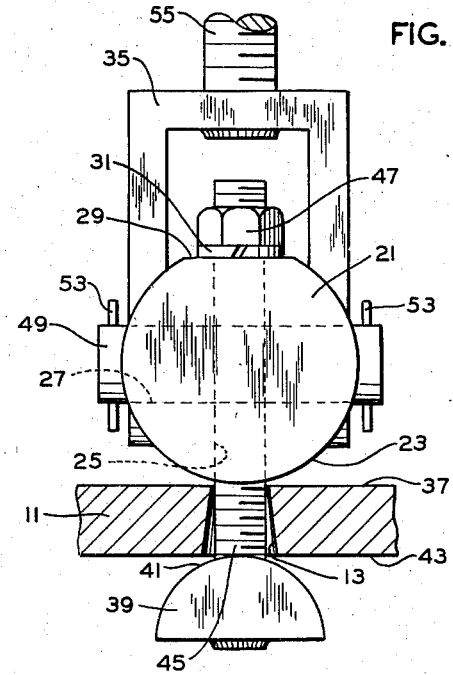
Figure 2 is an enlarged, partly sectioned, elevation of the lower portion of Figure 1, illustrating those components of the support which permit universal movement.
Figure 3:
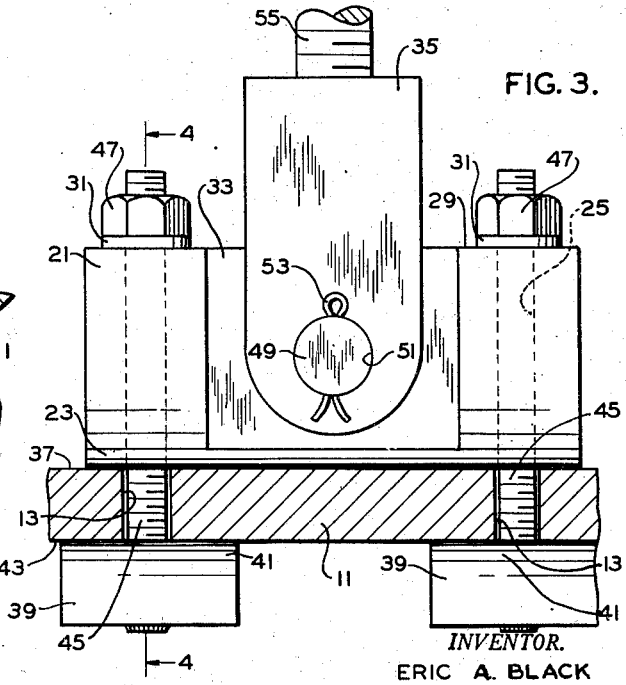
Figure 3 is a partly sectioned, side elevational view of Figure 2.

As shown in Figures 1–3 of the drawings, the lower, proximal end of the adjustable support is secured to a flat bearing plate 11, which is pierced by two holes 13. Each of said holes 13 is so shaped that it is of circular contour at its upper extremity and of oval contour at its lower extremity. The upper, distal end of the support is shown secured to a flange 15 projecting from the lower end of one leg 17 of a tripod, which flange is pierced by a single hole 19.

The adjustable support itself includes a roller member 21, which is generally cylindrical in shape, being provided with a substantially cylindrical rolling surface 23. It is pierced, near each end, by a transverse, vertically disposed, bolt hole 25 and, at its central portion, by a transverse, horizontally disposed, pivot hole 27. Its top surface 29 is flattened to receive lock washers 31, and its sides 33 are flattened to receive a U-shaped yoke 35, as will hereinafter appear. Said roller member 21 rests upon the upper bearing surface 37 of the bearing plate 11, aforementioned.

Disposed below said bearing plate 11 are a pair of bolt heads 39, which form auxiliary roller members to coact with the aforesaid roller member 21. Said bolt heads 39 are substantially semicylindrical in shape and their upper rolling surfaces 41 are in contact with the lower bearing surface 43 of the bearing plate 11.

Each of said bolt heads 39 is permanently secured to a bolt shank 45, as by threading said shank into said head and welding it therein. Each of said shanks 45 passes up through one of the holes 13 in the plate 11 and one of the bolt holes 25 in the roller member 21 and is secured in such position by a nut 47 and lock washer 31.

Although, in the drawings, the rolling surfaces 23 and 41 are simple cylindrical surfaces, in modifications of the device they may be more complex curves, as will hereinafter appear.

An inverted U-shaped yoke 35 spans the central portion of the roller member 21 and is pivotably secured thereto by a pivot pin 49, which passes through the pivot hole 27 and a pair of holes 51 in the yoke, said pivot pin being suitably retained, as by a pair of cotter pins 53.

A threaded shaft 55 is rigidly secured to the upper end of the yoke 35, as by being threaded into a hole in said yoke and permanently welded therein. Threadably coupled to the upper end of said shaft 55 is an internally threaded tubular sleeve 57. A threaded rod 59 is rigidly, coaxially, secured to the upper end of said sleeve 57, by being threaded into its upper end for a short distance and permanently welded in that position.

The rod 59 is provided with a nut 61 and both said rod and said nut are pierced respectively by transverse holes 63 and 65. The shaft 55, sleeve 57, rod 59 and nut 61 form the longitudinally adjustable leg member of the support, as will be shown. The flange 15 aforementioned is secured to the rod 59 above the upper end of the sleeve 57 and is held in place by the nut 61. There is also provided a short pin (not shown) to fit the holes 63, 65.

In the operation of the device just described, longitudinal adjustment is accomplished by raising the nut 61 until the holes 63 and 65 are in register, inserting through said holes the short steel pin (not shown), mentioned above, and rotating said nut 61, as by means of a wrench. Such rotation of the nut 61 will rotate the rod 59 and the sleeve 57, thereby causing said rod and sleeve to move longitudinally relative to the shaft 55.

Universal movement of the support is accomplished by pivoting the shaft 55 about the pivot pin 49 (to the left or right in Figure 3) and swinging said shaft 55 by rolling the roller member 21 on the bearing plate 11 (to the left or right in Figure 2), thus permitting universal movement of said shaft.

For limited angular movements, the simple cylindrical rolling surfaces 23 and 41 and the flat bearing surfaces 37 and 43 will be suitable. However, if any appreciable swing is anticipated, the said surfaces should be suitably curved so that, at all anticipated positions to which the support may be swung, the rolling and bearing surfaces will not lose contact. Suitable curvature may then be given to one or more of said surfaces 23, 41, 37, 43. Minor irregularities, however, may be taken up by substituting spring washers (not shown) for the lock washers 31.

Figure 4:
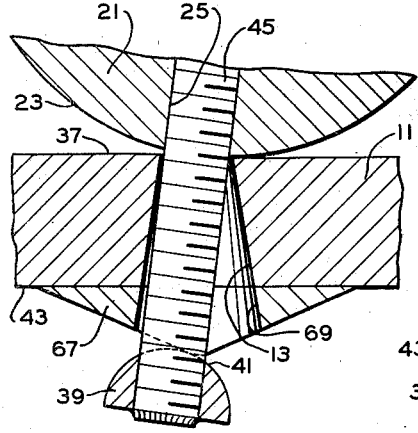
Figure 4 is a further enlarged, fragmentary, vertical section, along the line 4—4 of Figure 3, of a modified form of the lower end of the support, wherein the parts are shown in an angulated position.

In a particular embodiment (as shown in the modification of Figure 4), designed for allowing the shaft 55 to swing about the axis of the roller member 21 through a maximum of 14°, it was found advisable to provide curvature to the lower bearing surface 43 of the bearing plate 11. This was done by welding two small shoes 67 to the surface 43 to act as bearing surfaces respectively for the rolling surfaces 41. Each of said shoes 67 is pierced by a hole 69 which is shaped to continue the contours of one of the holes 13, as already described. Such arrangement entirely prevents any backlash or play between the parts during the contemplated movements thereof.

It will also be understood that, should it be deemed advisable in any particular application, any conventional means may be utilized for keeping the bolt heads 39 properly oriented so that their axes of curvature are parallel to the axis of curvature of the roller member 21. One such means might be for the two bolt heads 39 to comprise a single piece of material to which are secured the two shanks 45. Although the shanks 45 are shown as completely threaded in the drawings, it would be preferable to thread them only at their extremities.

It will be noted that, in the embodiments just described stresses and strains will be suitably distributed in that, among other things, there will be at all times a line contact between the rolling surface 23 and the upper bearing surface 37 and similar line contacts between the rolling surfaces 41 and the lower bearing surface 43, and also between the bolt shanks 45 and the holes 13.

While there has been described what, at present, are considered preferred embodiments of the present invention, it will be obvious to those skilled in the art that various changes and modifications may be made therein without departing from the invention and it is, therefore, aimed in the appended claims to cover such changes and modifications as fall within the true spirit and scope of the invention.

What is claimed is:

1. An adjustable support for a load comprising two substantially flat, parallel, spaced, bearing surfaces, facing away from each other; two roller members; each such member being provided with a curved rolling surface in substantially rollable contact with one of said bearing surfaces, the axes of said rolling surfaces being parallel to each other and to the bearing surfaces; means to hold said roller members in substantially fixed spaced disposition relative to each other; a leg member; the proximal extremity of said leg member being pivotably secured to one of said roller members, the pivoting axis being substantially perpendicular to the axes of the rolling surfaces; and means on the distal extremity of the leg member receivable to a load.

2. An adjustable support for a load comprising two spaced, bearing surfaces, facing away from each other; two roller members; each such member being provided with a curved rolling surface in substantially rollable contact with one of said bearing surfaces, the axes of said rolling surfaces being parallel to each other and to the bearing surfaces; means to hold said roller members in substantially fixed spaced disposition relative to each other; a leg member; the proximal extremity of said leg member being pivotably secured to one of said roller members, the pivoting axis being substantially perpendicular to the axes of the rolling surfaces; and means on the distal extremity of the leg member receivable to a load.

3. An adjustable support to sustain a load relative to a base, comprising a substantially flat bearing plate secured to the base, a hole through said plate, a substantially cylindrically surfaced roller member in contact with one surface of said plate, a substantially cylindrically surfaced bolt head in contact with the other surface of said plate, a bolt shank secured to said bolt head and extending through the hole in said plate and secured to the roller member, a leg member pivotally secured to the roller member to permit it to swing about an axis substantially perpendicular to the axis of the roller member, means on said leg member to receive a load.

4. An adjustable support to sustain a load relative to a base, comprising a bearing plate secured to the base, a hole through said plate, a substantially cylindrically surfaced roller member in contact with one surface of said plate, a substantially cylindrically surfaced bolt head in contact with the other surface of said plate, a bolt shank secured to said bolt head and extending through the hole in said plate and secured to the roller member, a leg member pivotably secured to the roller member to permit it to swing about an axis substantially perpendicular to the axis of the roller member, means on said leg member to receive a load.

5. An adjustable support to sustain a load relative to a base and permit both variation of the distance between the load and the base and substantially universal movement, within limits, of the load relative to the base, comprising a bearing plate secured to the base, two holes in said bearing plate, a roller member, a curved rolling surface on said roller member to permit the roller member to roll linearly upon said bearing plate, two holes through said roller member normal to the rolling axis thereof, fastening means extending through said last mentioned holes and the holes in the bearing plate, a head on the lower end of each of said fastening means, a curved upper surface on each of said heads to permit said head to roll linearly upon the lower surface of said bearing plate and maintain substantially line contact therewith, a yoke spanning said roller member and pivotably secured thereto, the axis of such pivot being substantially normal to the rolling axis of the rolling member and substantially normal to the axis of the fastening aforesaid, a shaft secured to said yoke, a load supporting member threadably coupled to the said shaft and receivable to the load.

6. An adjustable support comprising a substantially flat bearing plate, a substantially cylindrically-shaped roller member adapted to roll on the upper surface of said plate, a substantially semi-cylindrically-shaped roller member adapted to roll on the lower surface of said plate, a bolt joining the said roller members, its axis extending transversely through the rolling axes of said roller members and through said bearing plate, a shaft adjustable in length, one end thereof pivotably secured to the first mentioned roller member and the other end thereof provided with load receiving means.

7. An adjustable support comprising a bearing plate, a roller member adapted to roll on the upper surface of said plate, a roller member adapted to roll on the lower surface of said plate, a bolt joining the said roller members, its axis extending transversely through the rolling axes of said roller members and through said bearing plate, a shaft adjustable in length, one end thereof pivotably secured to the first mentioned roller member and the other end thereof provided with load receiving means.

ERIC A. BLACK.

REFERENCES CITED

The following references are of record in the file of this patent:

UNITED STATES PATENTS

| Number | Name | Date |
|---|---|---|
| 1,298,424 | Warrener | Mar. 25, 1919 |
| 1,636,562 | Hick | July 19, 1927 |
| 2,187,426 | Kunnel | Jan. 16, 1940 |
| 2,388,296 | Simpson | Nov. 6, 1945 |

Certificate of Correction

Patent No. 2,449,049.    September 14, 1948.

ERIC A. BLACK

It is hereby certified that errors appear in the printed specification of the above numbered patent requiring correction as follows:

Column 2, line 11, for the word "member" read *movement*; line 30, after "is a" insert a comma; line 31, after "and" insert a comma; column 5, lines 10 and 11, claim 3, for "pivotally" read *pivotably*;

and that the said Letters Patent should be read with these corrections therein that the same may conform to the record of the case in the Patent Office.

Signed and sealed this 8th day of March, A. D. 1949.

[SEAL]

THOMAS F. MURPHY,
*Assistant Commissioner of Patents.*